Patented July 1, 1941

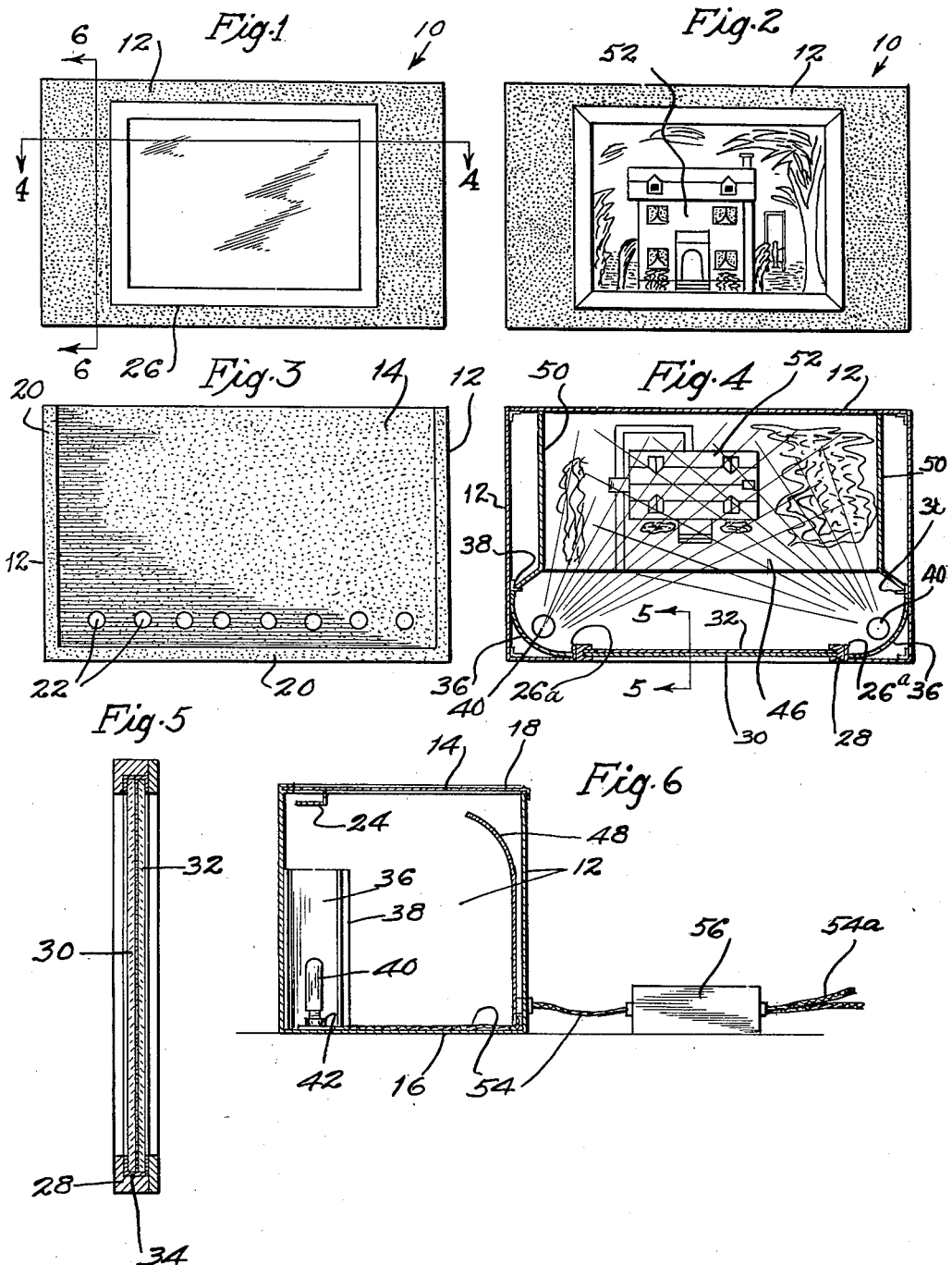

2,247,545

UNITED STATES PATENT OFFICE 2,247,545

DISPLAY APPARATUS

James Deck, Los Angeles, and Harry Grundstrom, North Hollywood, Calif.

Application July 29, 1938, Serial No. 221,996

1 Claim. (Cl. 40—132)

The device of this invention relates to means to attract the attention of the public to articles for display and advertising purposes.

Many devices have been conceived as a means of arousing the curiosity and attention of the public at large for the purpose of advertising, but insofar as applicants have been informed, no device has yet been developed which presents the novelty of the present invention, nor a device which arouses and holds the attention of the public as does the apparatus of the present invention.

The device of the present invention includes the use of silvered glass sheets arranged in the manner of a mirror, and so arranged as to form the window of the space into which the observer may see upon illumination of the space, but which glass window forms only a mirror reflecting the image of the observer during those intervals in which the interior of the space is not illuminated.

Therefore, it is a prime object of the present invention to provide a display apparatus employing an inner space which is blackened by exclusion of light and having a major bounding or wall surface formed of non-opaqued silvered glass plate, wherey the image of an observer is normally reflected, but being so arranged that the interior of the apparatus may be intermittently illuminated in varying intensity, whereupon the said interior and objects therein may be viewed without impairment or reflection of the image of the observer.

A further object of the invention is to provide a simple, reliable and low cost display device or apparatus, yet a device which arouses and holds the attention and curiosity of the average person.

Other objects, features, and advantages of the invention may be apparent from the accompanying drawing, the specification, and the subjoined claim.

In the drawing, of which there is one sheet:

Figure 1 is a front elevation showing one form of the device of this invention, wherein the reflecting surface or window reflects only the light which falls upon it, thereby rendering it impossible to see the interior of the apparatus and the objects on display therein.

Figure 2 is a view generally analogous to Figure 1, excepting that here an object on display within the device may be clearly seen.

Figure 3 is a plan view of the display apparatus housing.

Figure 4 is a sectional view in plan as seen along line 4—4, in Figure 1, showing matter placed in the space for display, also showing the position of lamps and reflectors used to illuminate the interior of the device.

Figure 5 is a sectional elevation as seen along line 5—5, in Figure 4, the view shows the construction of the window or reflecting surface as the case may be, also showing one form of seal used around the edges of the glass plates used for the purpose of excluding light.

Figure 6 is a sectional elevation showing the construction as viewed along line 6—6, Figure 1.

In the drawing the reference character 10 indicates a housing for the device of this invention, and as reference to the other figures of the drawing will show, is formed as a box having light leakage proof sides 12, top 14, and bottom 16. The top 14 is slidable in grooves 18 formed by an over-turned edge 20 of the end panel or sides, and the front side of the housing. Apertures 22 may be formed in the slidable top 14, while an under-hanging lip 24 secured to the top 14 is adapted to prevent infiltration of light through the said openings 22.

The front wall 12a is formed with an opening 26 formed by cutting a suitably shaped opening therein, while the marginal edges of the opening so cut may be bent backwardly to form a flange 26a. A frame 28 carrying a silvered glass plate 30 and having a like shaped glass plate 32 in abutment with the silvered side of glass plate 30, and having the entire edge portion of the plates 30 and 32 sealed with a light proof tape 34 or other suitable material, is adapted to fit within the opening 26, and forms a framed mirror or window for the device depending upon circumstances of use as will be hereinafter set forth.

Concave reflectors 36 are positioned in the forward inner corners of the housing, being held in vertically removable position by means of the flanges 26, and an L-shaped rib 38 which is suitably secured to the end walls 12 of the housing 10. Lamps 40 secured in bases 42 are adapted to illuminate the interior of the housing upon occasion.

Other than for the aforementioned elements the interior of the housing 10 is empty, except as will now be described.

Since it is the prime object of the present invention to display any object of human interest, any such objects may be used for display purposes, the only limitation being the size of the object with respect to the size of the display housing available for use.

In the instant disclosure, a miniature house with a surrounding yard or garden is used for the purpose of illustration. The whole of the display resting upon a removable board 46, while an overhanging back-drop 48, and side-wings 50, all harmoniously decorated are used to form a proper and attractive setting for the house 52.

The lamps 40 are energized through a circuit 54, which is connected with a circuit interrupter 56 which may be any device to alternately energize and de-energize the circuit to the lamps. Also the circuit interrupter may be in the form of a rheostat or other device to cause a more or less gradual fading of illumination in the lamps, or to cause and obtain any degree of illumination within the housing 10 as may be required to properly display artistic subject matter, for the light values required to properly display different objects varies greatly from that of a flood of illumination, to just enough to enable the observer to see or discern the object on display.

The form of the device illustrated in the drawing is intended for display as an attraction for drug stores, banks, general merchandising establishments, and all other places where it is customary and/or desirable to attract the attention of the public at large for the purpose of advertising objects, or for casual illustrative purposes or for educational purposes.

The box 10 as previously stated must be lightproof, being provided with a dull black interior surface for absorption of all possible exterior light which may enter through openings which perforce are necessary to operate the device.

The silvered glass 30 is coated with just enough silver in the form of an atomized spray to obtain reflection when there is no light back of the glass, thus leaving in a sense a silvered surface having a myriad of minute apertures therein. The glass 32 is then placed against the silvered surface and the marginal edges are sealed to prevent entrance of air and light. After assemblage the glasses are placed in their frame 28 which is then sealed in the opening 26.

Any suitable object, such as the miniature house 52 is then placed inside of the housing 10, and the top 14 is slid to closed position.

The device may now be placed in position for observation and the end 54a of circuit 54 is connected with an electric circuit, with the circuit interrupter interposed between the source (not shown) and the display apparatus.

During the interval that the lamps within the apparatus are not illuminated the observer in looking at the device sees only his own image or that of other reflected objects, however, as soon as the device 56 closes the circuit 54, the lamps are lighted and the interior of the housing is illuminated, thereby nullifying reflected light and rendering the mirror transparent and enabling the observer to readily see into the interior of the housing.

The suddenness and completeness of the transition from seeing a reflected image of the observer and other adjacent surroundings to that of the object on display is complete and overwhelming to the average person, and of course entirely beyond his understanding.

The principle involved in the present invention is not necessarily confined to relatively small pre-formed housing structures, as previously described, but may be employed in the display windows of stores or shops.

If it is desired to arrange a store window in the manner set forth herein, all that is necessary is to build a boxlike structure of the approximate dimension of the store window, exclude all natural or artificial light therefrom, and then to arrange for an interrupted lighting effect in conformity with the principles herein set forth, and to substitute an enlarged form of the mirror herein employed for the window glass in normal use. As previously stated the effect on the average person is startling, although pleasant, and will hold his interest, for he undertakes to puzzle out the thing which he sees and does not see, and least of all understands.

A further modification of the larger arrangement for store windows is to place a thin black partition between two different displays. The effect is all that can be expected in an effort to attract the attention of the public.

It is conceivable that various changes and modifications and variations may be made in practicing the invention in departure from the particular showing of the drawing and description as given, without however departing from the true spirit of the invention as defined by the scope of the appended claim.

We claim:

A display apparatus comprising a housing structure having a translucent mirror forming a substantial portion of one side of said structure, a space within said housing to receive an article for display therein and a shield placed rearwardly of and along the sides of the article on display and in harmony with the theme thereof so as to artistically develop the display, and elongated concave reflectors positioned forwardly and laterally of the display to diffuse light of substantial equal intensity over the whole of the display, and means to illuminate the interior of said housing.

JAMES DECK.
HARRY GRUNDSTROM.